(12) United States Patent
Ogawa

(10) Patent No.: US 7,727,661 B2
(45) Date of Patent: Jun. 1, 2010

(54) FUEL CELL SYSTEM WITH GOLD GASKET

(75) Inventor: Tetsuya Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 354 days.

(21) Appl. No.: 11/795,112

(22) PCT Filed: Jan. 13, 2006

(86) PCT No.: PCT/JP2006/000782

§ 371 (c)(1),
(2), (4) Date: Jul. 11, 2007

(87) PCT Pub. No.: WO2006/075790

PCT Pub. Date: Jul. 20, 2006

(65) Prior Publication Data

US 2008/0020251 A1    Jan. 24, 2008

(30) Foreign Application Priority Data

Jan. 13, 2005    (JP) .............................. 2005-006583

(51) Int. Cl.
*H01M 2/14* (2006.01)
*H01M 8/12* (2006.01)

(52) U.S. Cl. .......................................... 429/39; 429/26

(58) Field of Classification Search ................... 429/26, 429/32, 34, 35, 36, 37, 38, 39

See application file for complete search history.

(56) References Cited

U.S. PATENT DOCUMENTS

| 5,591,537 | A | 1/1997 | Bagger et al. |
| 5,851,689 | A | 12/1998 | Chen |
| 2003/0012986 | A1* | 1/2003 | Koschany .................... 429/13 |
| 2003/0235745 | A1* | 12/2003 | Mook et al. .................. 429/35 |
| 2004/0247987 | A1* | 12/2004 | Izumi et al. .................. 429/38 |

FOREIGN PATENT DOCUMENTS

| JP | 07-057748 | 3/1995 |
| JP | 10-012252 | 1/1998 |

* cited by examiner

*Primary Examiner*—Dah-Wei D Yuan
*Assistant Examiner*—Stephan Essex
(74) *Attorney, Agent, or Firm*—Lahive & Cockfield, LLP; Anthony A. Laurentano

(57) ABSTRACT

A flow passage member and a reformed gas supply pipe for supplying a reformed gas to a fuel cell stack are provided. Hot air to be supplied to the fuel cell stack flows through the flow passage member. A gold gasket is provided at a joint portion between the flow passage member and the reformed gas supply pipe. The gold gasket has malleability to achieve stable sealing performance and durability in the presence of the oxidizing atmosphere and the reducing atmosphere at high temperature.

10 Claims, 12 Drawing Sheets

- · → FUEL GAS
- → OXYGEN-CONTAINING GAS

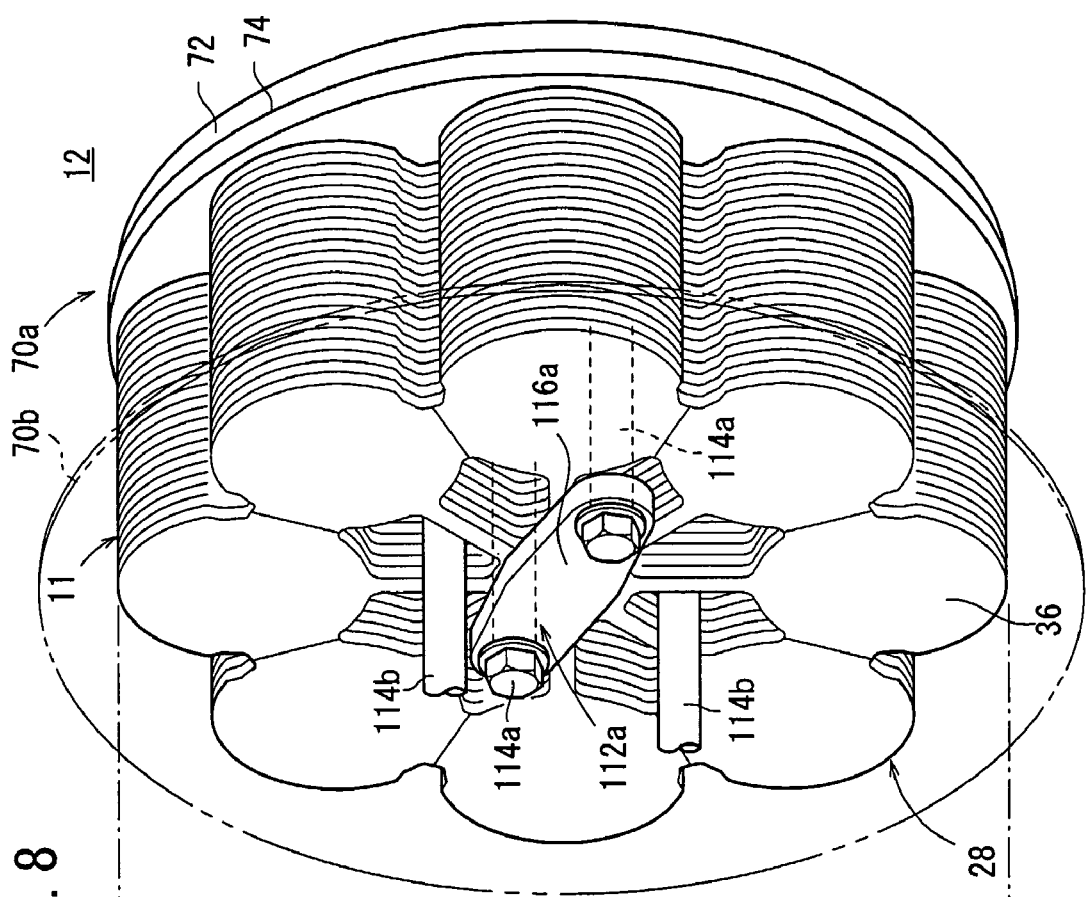
FIG. 8
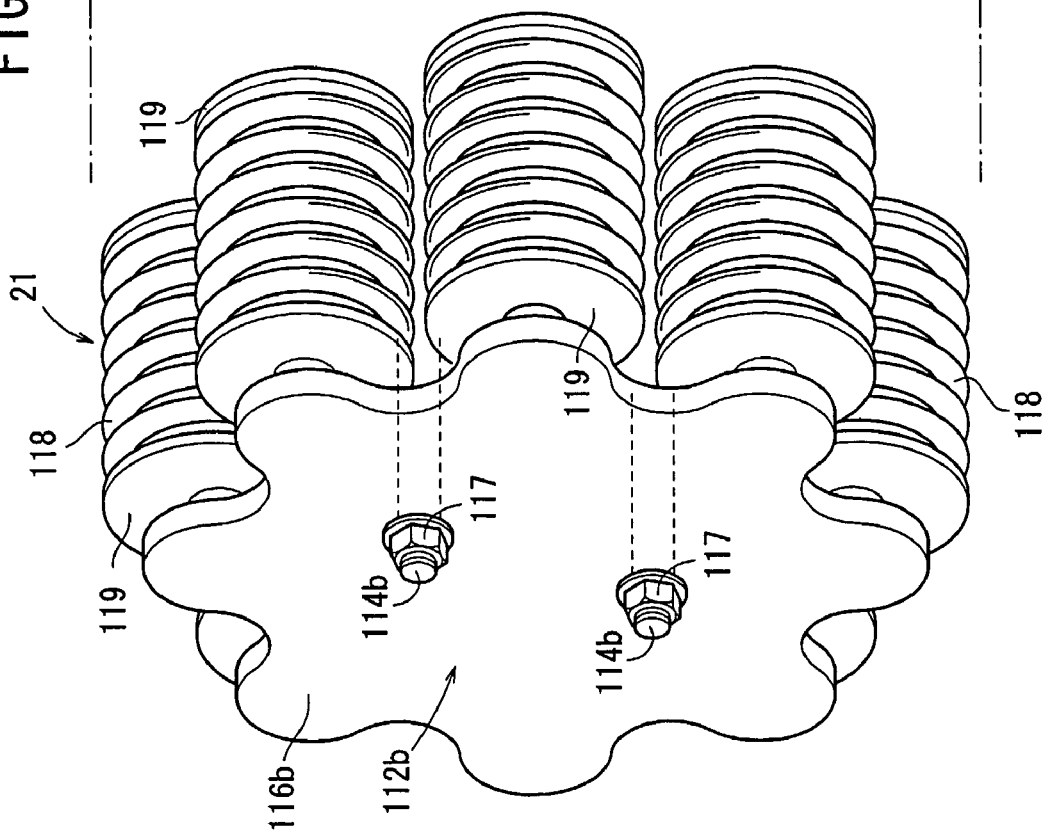

FIG. 11
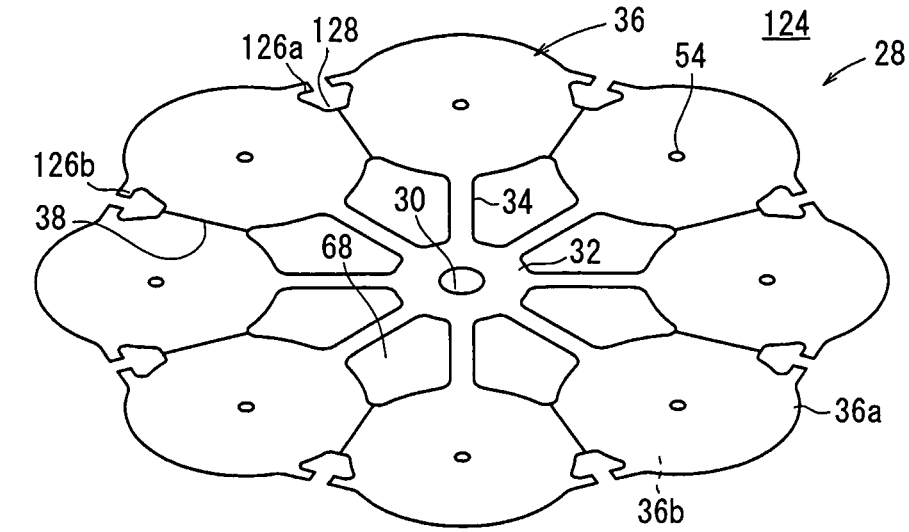
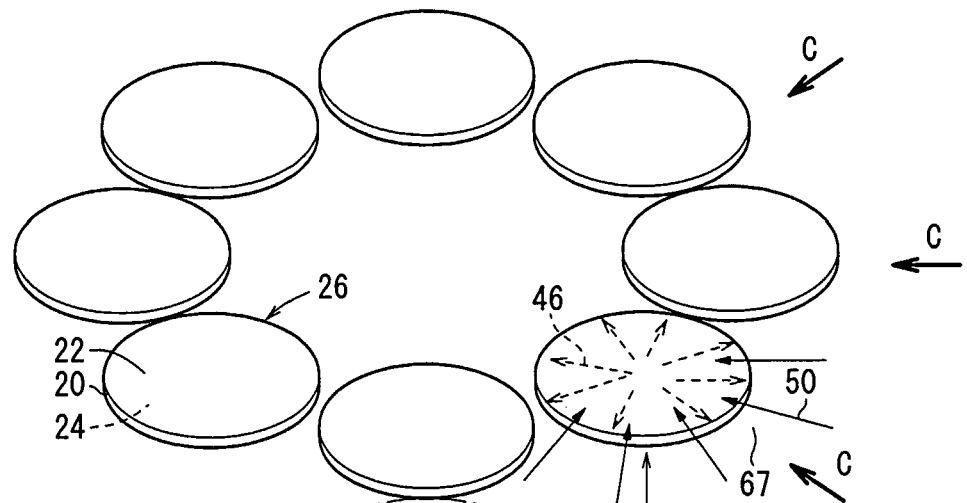
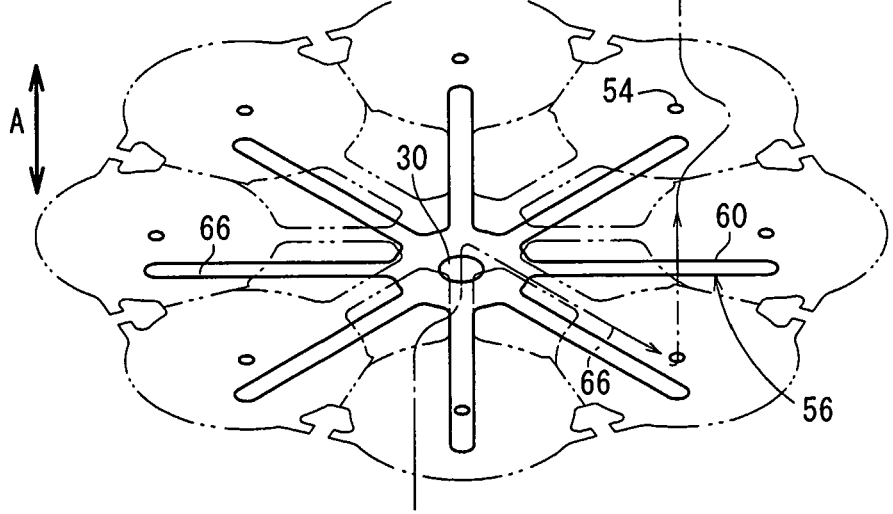
—·—▶ FUEL GAS
——▶ OXYGEN-CONTAINING GAS

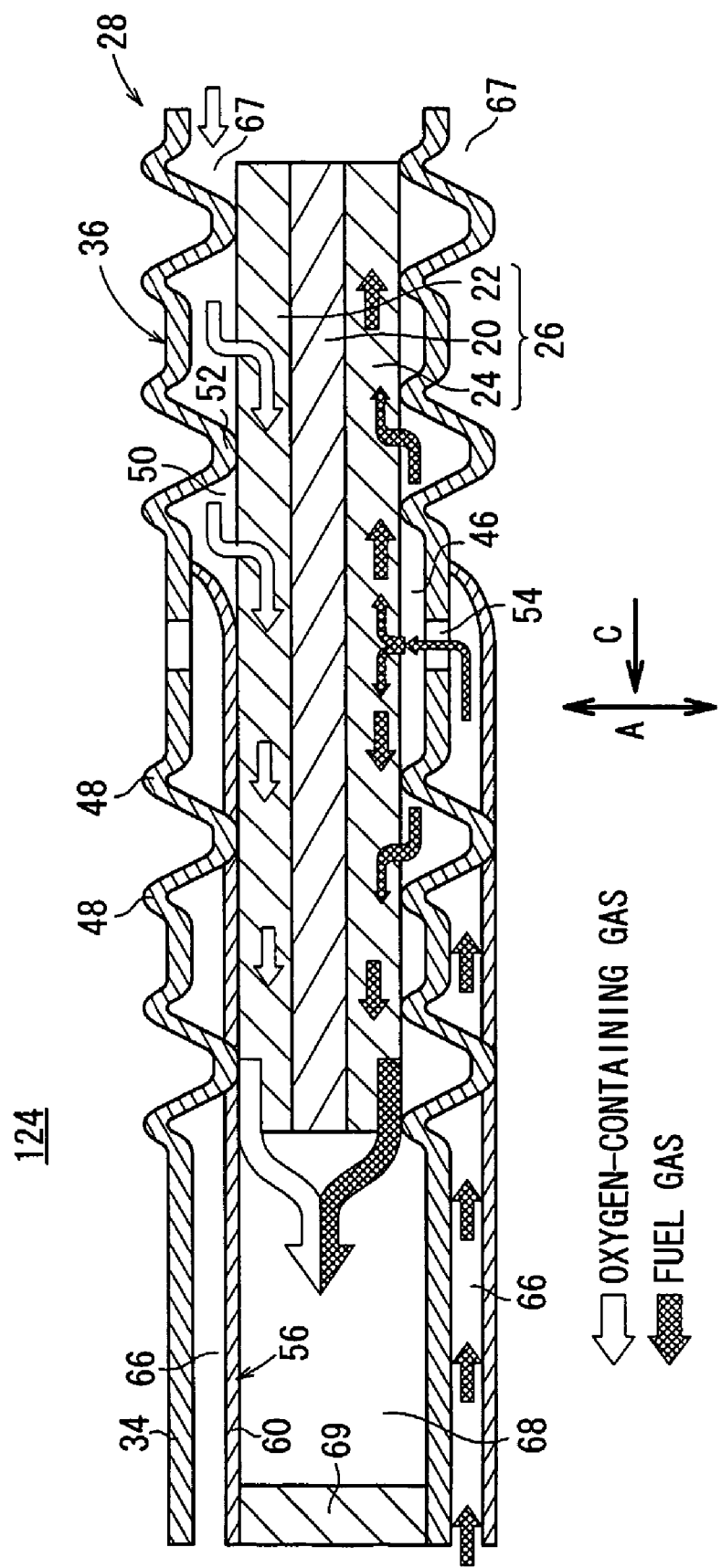

FUEL CELL SYSTEM WITH GOLD GASKET

RELATED APPLICATIONS

This application is a 35 U.S.C. 371 national stage filing of International Application No. PCT/JP2006/300782, filed 13 Jan. 2006, which claims priority to Japanese Patent Application No. 2005-006583 filed on 13 Jan. 2005 in Japan. The contents of the aforementioned applications are hereby incorporated by reference.

TECHNICAL FIELD

The present invention relates to a fuel cell system including a fuel cell. The fuel cell includes an electrolyte electrode assembly and separators sandwiching the electrolyte electrode assembly. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined number of the unit cells and the separators are stacked together to form a fuel cell stack.

In the fuel cell, an oxygen-containing gas or the air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. Oxygen ions react with the hydrogen in the hydrogen-containing gas to produce water or react with CO to produce $CO_2$. Electrons released in the reaction flow through an external circuit to the cathode, creating a DC electric energy.

In the solid oxide fuel cell, the operating temperature is significantly high, about 800° C., and an oxidizing gas and a reducing gas are used. Therefore, it is desirable that the gasket for the solid oxide fuel cell has heat resistance, and can be used suitably in the oxidizing atmosphere and the reducing atmosphere. Further, the gasket needs to have malleability and flexibility for maintaining the desired sealing performance.

In view of the above, Japanese Laid-Open Patent Publication No. 7-57748 (hereinafter referred to as the "first conventional technique") discloses a gasket member for use in high temperature. The gasket member is formed by mixing ceramic fiber and glass having a high melting point into a sheet-like shape. According to the disclosure of the first conventional technique, sufficient gas sealing performance is maintained at high temperature in the range of 1000° C. or more, and improvement in durability is expected.

Further, Japanese Laid-Open Patent Publication No. 10-12252 (hereinafter referred to as the "second conventional technique") discloses a seal member made of a sintered body of raw powder chiefly containing oxide powder having the average grain size of 0.5 μm or less and a melting point higher than the operating temperature of the fuel cell. The seal member is used at the seal portion for sealing the end of the interface between a power generation cell and a separator. According to the disclosure of the second conventional technique, the seal member can keep its solid state at the operating temperature of the fuel cell, and the seal member is chemically stable in the oxidizing atmosphere and the reducing atmosphere.

However, in the first conventional technique, if the gasket member is used for a long period of time, it is likely that the high melting point glass is degraded due to repetition of expansion and contraction. As a result, the high melting point glass may be shattered, and the fiber or the like may be shattered from the ceramic fiber due to degradation. Thus, the fuel cell is degraded undesirably.

In the second conventional technique, since the seal member does not have any flexibility, the desired sealing performance may not be achieved. Further, the material of the seal portion is the same as the material of the electrolyte. That is, the material of the seal member for the seal portion is limited to the material of the electrolyte. Thus, the seal member is not suitable for general use. Since the seal member is fragile, the seal member cannot be used at the position where a tightening force is applied.

DISCLOSURE OF INVENTION

A main object of the present invention is to provide a fuel cell system having a simple structure in which the sealing performance is maintained in the presence of the oxidizing atmosphere and the reducing atmosphere at high temperature, and to provide a fuel cell usable for a long period of time without degradation.

The present invention relates to a fuel cell system including a fuel cell. The fuel cell includes an electrolyte electrode assembly and separators sandwiching the electrolyte electrode assembly. The electrolyte electrode assembly includes an anode, a cathode, and an electrolyte interposed between the anode and the cathode. Further, the fuel cell system includes a flow passage member provided at one end of the fuel cell such that an oxygen-containing gas to be supplied to the cathode or an exhaust gas discharged from the fuel cell flows through the flow passage member, a pipe member connected to the flow passage member for supplying a fuel gas to the anode, and a gold gasket provided at a joint portion between the flow passage member and the pipe member.

Further, it is preferable that the fuel cell system further comprises a reformer and a heat exchanger. The reformer is provided adjacent to the flow passage member to reform a fuel for producing the fuel gas. The pipe member is connected to the reformer. The heat exchanger is provided around the reformer for heating the oxygen-containing gas to be supplied to the fuel cell. The reformer and the heat exchanger are provided coaxially with the central axis of the fuel cell.

Further, it is preferable that the pipe member is connected to a central portion of the fuel cell. In the structure, it is possible to effectively maintain the temperature of the pipe member where the fuel gas flows, and improve the thermal efficiency of the fuel cell as a whole.

Further, it is preferable that the heat exchanger exchanges heat between the oxygen-containing gas to be supplied to the cathode and the exhaust gas. In the structure, the exhaust heat of the exhaust gas is utilized for heating the oxygen-containing gas. Thus, the thermal efficiency is improved effectively.

BRIEF DESCRIPTION OF DRAWINGS

FIG. 8 is a partial exploded perspective view showing a load applying mechanism of the fuel cell system;

FIG. 11 is a partial exploded perspective view showing gas flows in the fuel cell; and FIG. 12 is a cross sectional view schematically showing operation of the fuel cell.

BEST MODE FOR CARRYING OUT THE INVENTION

Figure 1:
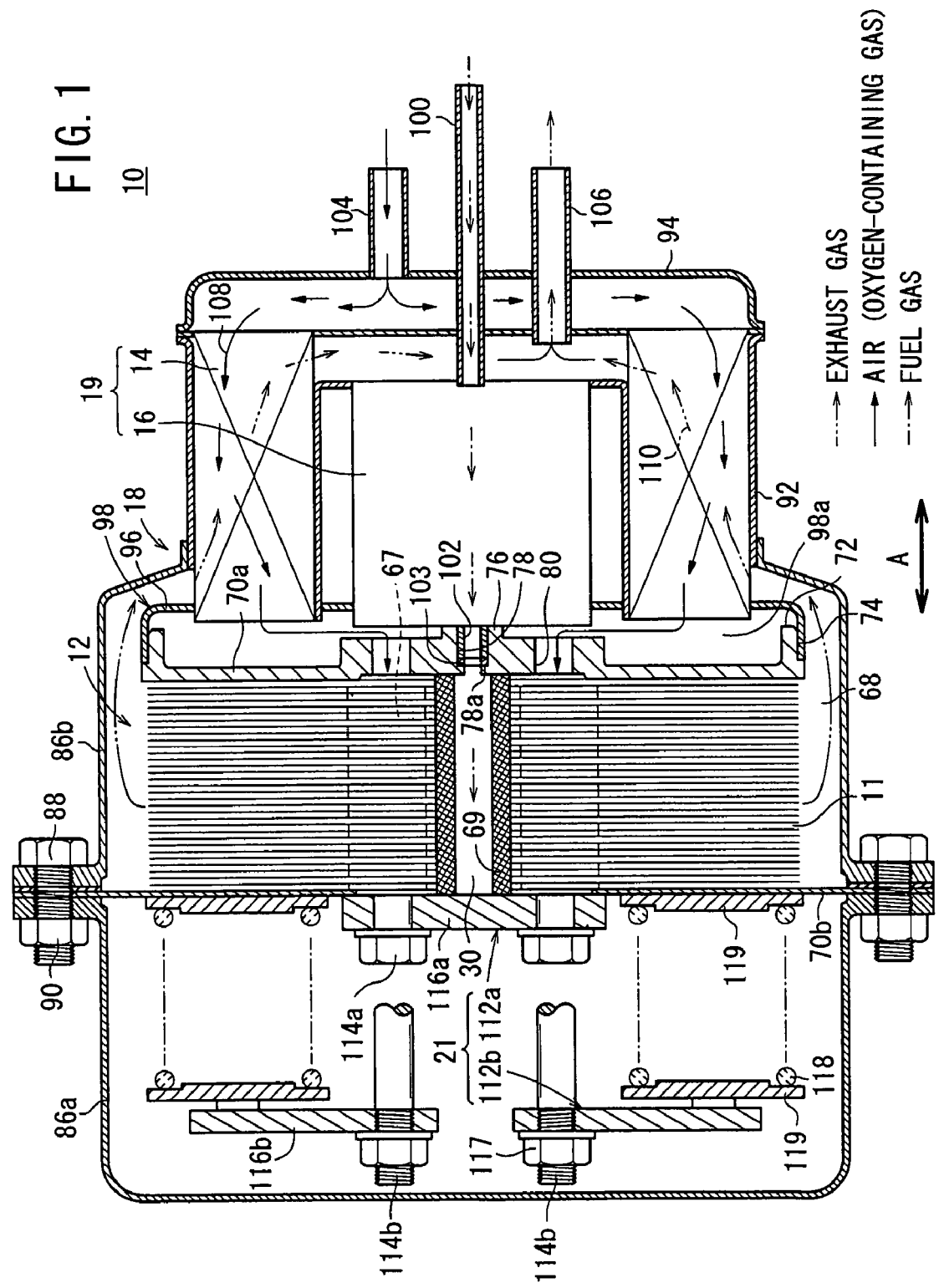
FIG. 1 is a partial cross sectional view showing a fuel cell system according to a first embodiment of the present invention.
Figure 2:
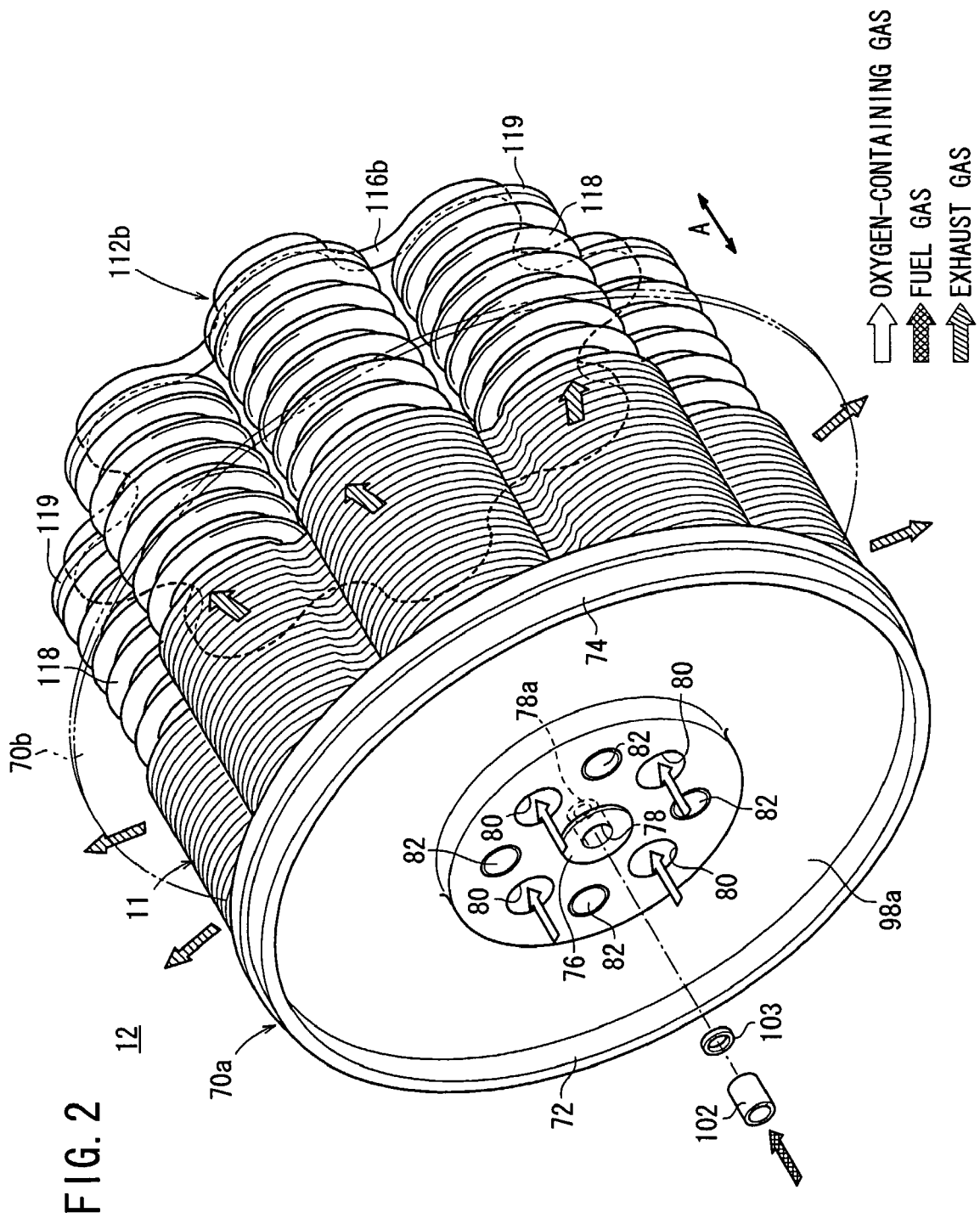
FIG. 2 is a perspective view schematically showing a fuel cell stack of the fuel cell system.

FIG. 1 is a partial cross sectional view showing a fuel cell system 10 according to a first embodiment of the present invention, and FIG. 2 is a perspective view schematically showing a fuel cell stack 12 formed by stacking a plurality of fuel cells 11 of the fuel cell system 10 in a stacking direction indicated by an arrow A.

The fuel cell system 10 is used in various applications, including stationary and mobile applications. For example, the fuel cell system 10 is mounted on a vehicle. As shown in FIG. 1, the fuel cell system 10 includes the fuel cell stack 12, a heat exchanger 14, a reformer 16, and a casing 18. The heat exchanger 14 heats the oxygen-containing gas before it is supplied to the fuel cell stack 12. The reformer 16 reforms a fuel to produce a fuel gas. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
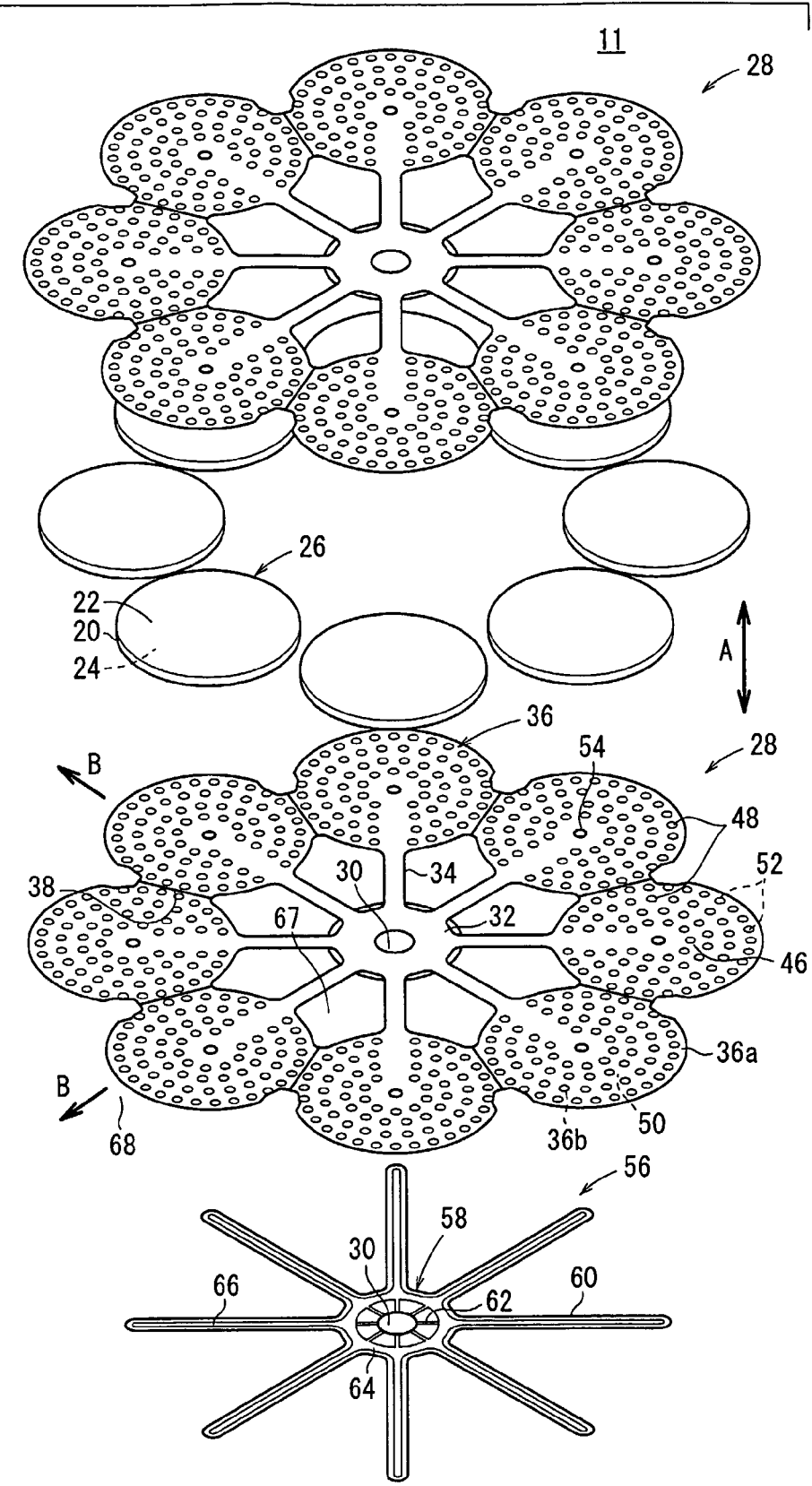
FIG. 3 is an exploded perspective view showing a fuel cell of the fuel cell stack.
Figure 4:
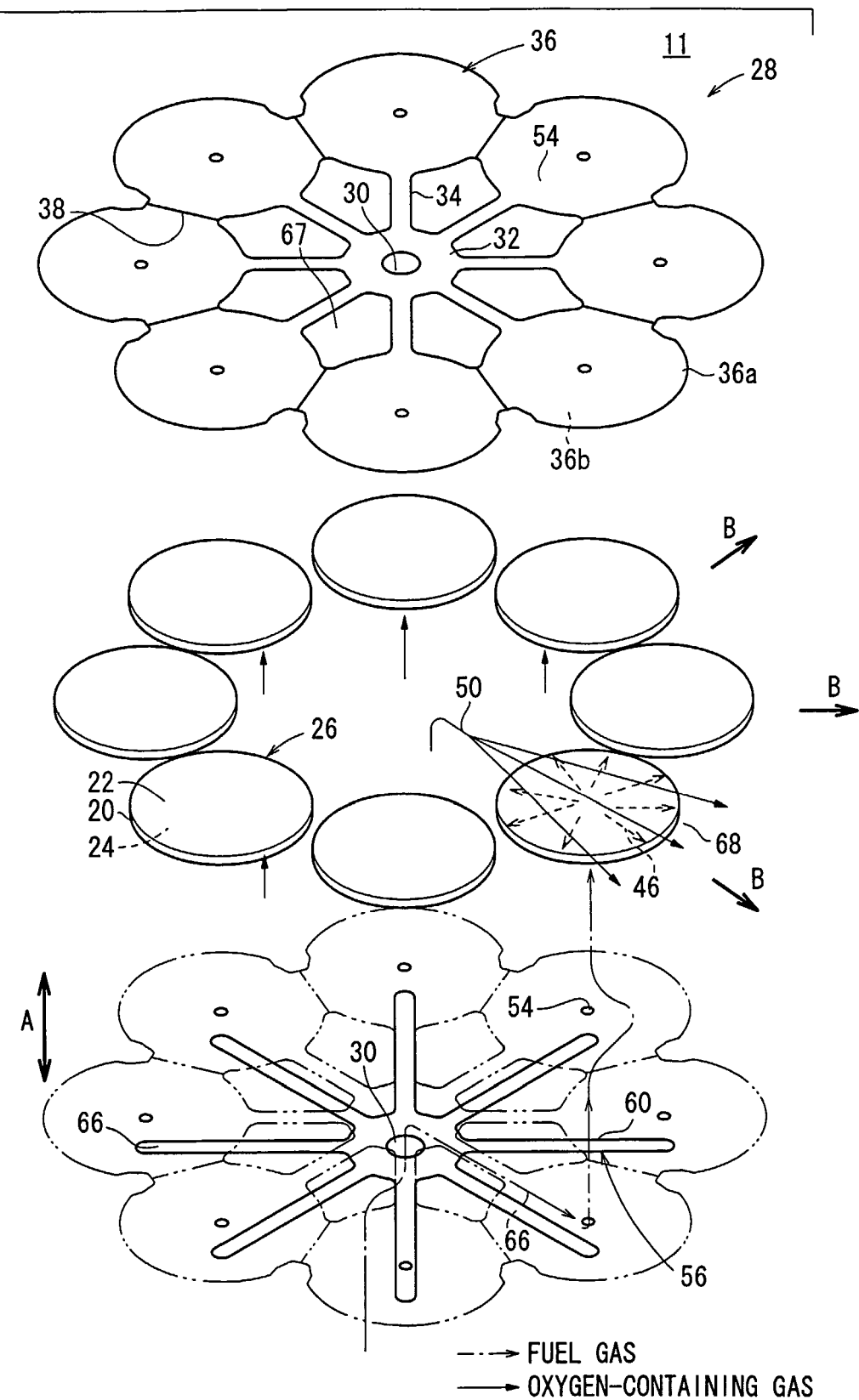
FIG. 4 is a partial exploded perspective view showing gas flows in the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the inner circumferential edge of the electrolyte electrode assembly 26 (central portion of the separator 28) for preventing the entry of the oxygen-containing gas.

A plurality of, e.g., eight electrolyte electrode assemblies 26 are interposed between a pair of separators 28 to form the fuel cell 11. The eight electrolyte electrode assemblies 26 are concentric with a fuel gas supply passage 30 extending through the center of the separators 28.

In FIG. 3, for example, each of the separators 28 comprises a metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size. The adjacent circular disks 36 are separated from each other by slits 38.

Each of the circular disks 36 has first protrusions 48 on its surface 36a which contacts the anode 24. The first protrusions 48 form a fuel gas channel 46 for supplying a fuel gas along an electrode surface of the anode 24. Each of the circular disks 36 has second protrusions 52 on its surface 36b which contacts the cathode 22 (see FIG. 5). The second protrusions 52 form an oxygen-containing gas channel 50 for supplying the oxygen-containing gas along an electrode surface of the cathode 22.

Figure 6:
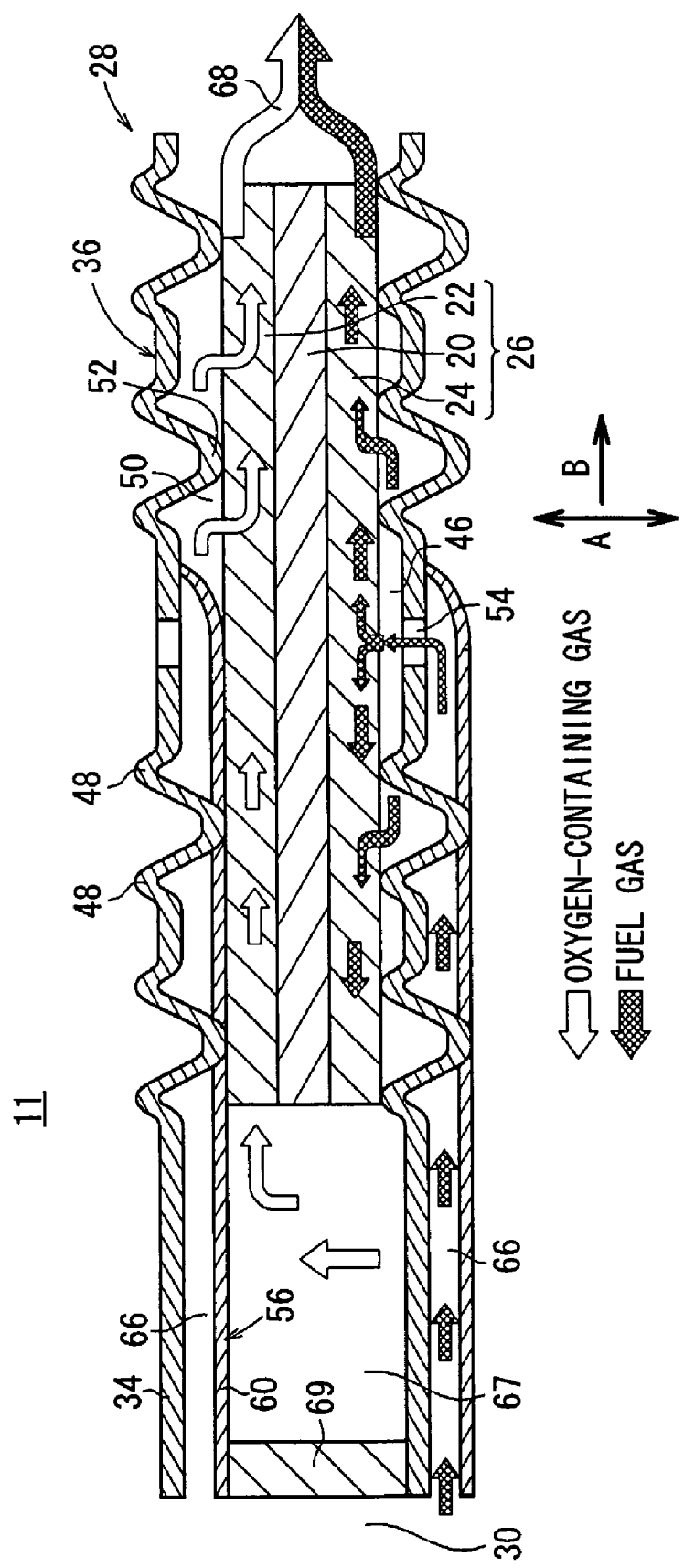
FIG. 6 is a cross sectional view schematically showing operation of the fuel cell.

As shown in FIG. 6, the first protrusions 48 and the second protrusions 52 protrude away from each other. The first protrusions 48 are ring shaped protrusions, and the second protrusions 52 are mountain shaped protrusions. The second protrusions (mountain shaped protrusions) 52 are surrounded by the first protrusions (ring shaped protrusions) 48.

Figure 5:
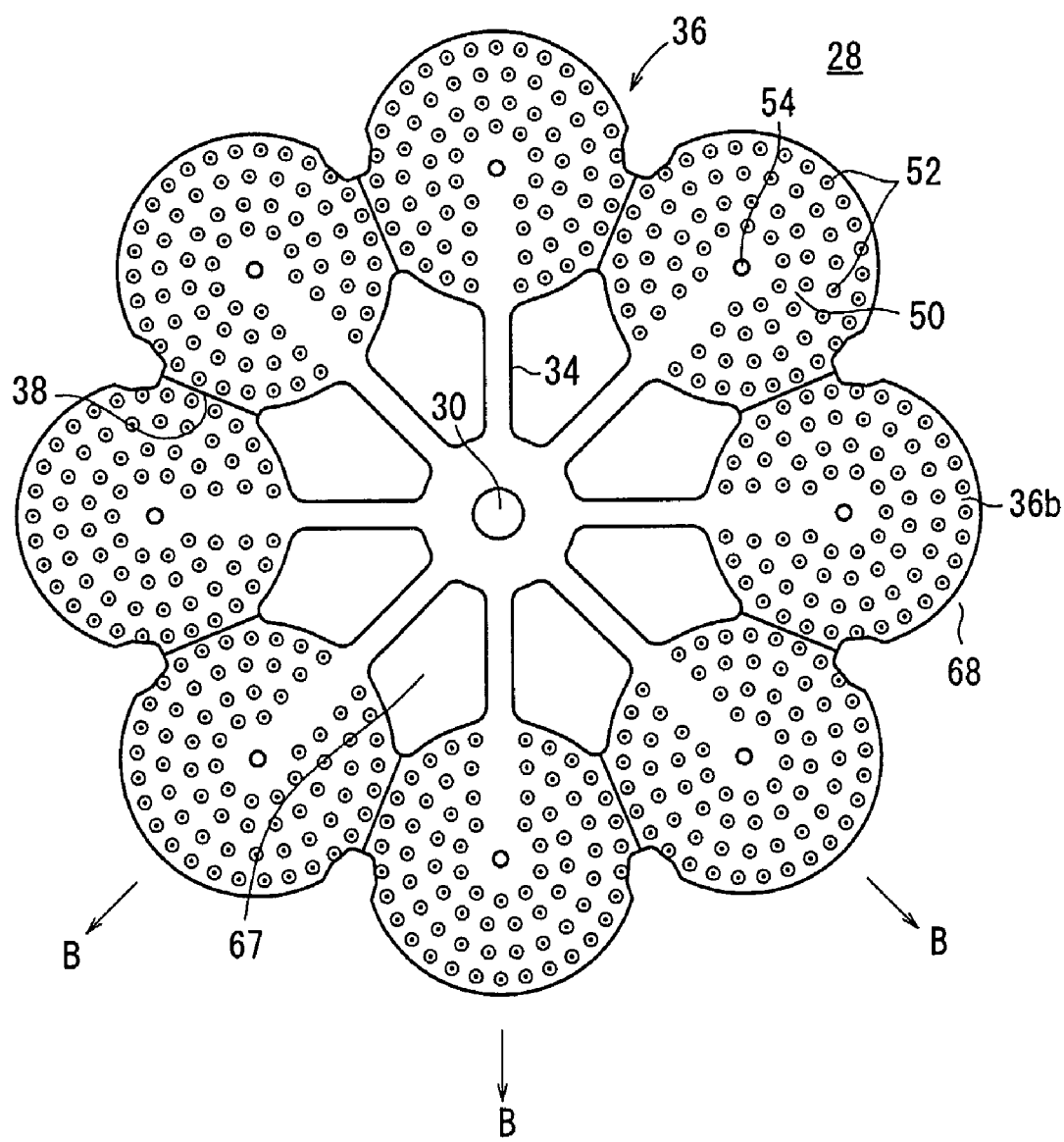
FIG. 5 is a front view showing a separator.

As shown in FIGS. 3 to 5, a fuel gas inlet 54 is provided in each of the circular disks 36. The fuel gas flows through the fuel gas inlet 54 into the fuel gas channel 46. The position of the fuel gas inlet 54 is determined so that the fuel gas can be distributed uniformly. For example, the fuel gas inlet 54 is provided at the center of the circular disk 36.

A channel member 56 is fixed to the separator 28 by brazing or laser welding on a surface facing the cathode 22. As shown in FIG. 3, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. The recess 64 prevents the flow of the brazing material, and achieves the uniform flow of the fuel gas. A fuel gas supply channel 66 is formed between the first and second bridges 34, 60. The fuel gas supply channel 66 is connected to the fuel gas channel 46 through the slits 62 and the recess 64.

As shown in FIG. 6, the oxygen-containing gas channel 50 is connected to an oxygen-containing gas supply unit 67. The oxygen-containing gas is supplied through the space between the inner circumferential edge of the electrolyte electrode assembly 26 and the inner circumferential edge of the circular disk 36. The oxygen-containing gas supply unit 67 is formed by spaces between the inner sides of the respective circular disks 36 and the first bridges 34, and extends in the stacking direction.

Insulating seals 69 for sealing the fuel gas supply passage 30 is provided between the separators 28. For example, the insulating seals 69 are made of mica material, or ceramic material. An exhaust gas channel 68 extends through the fuel cells 11 in the stacking direction outside the respective circular disks 36.

As shown in FIGS. 1 and 2, the fuel cell stack 12 includes a plurality of fuel cells 11 stacked together, and end plates 70a, 70b provided at opposite ends in the stacking direction. The end plate 70a has a substantially circular disk shape. A ring shaped portion 72 is formed in the outer circumferential region of the end plate 70a. The ring shaped portion 72 axially protrudes from the end plate 70a. A groove 74 is formed around the ring shaped portion 72. A columnar protrusion 76 is provided at the center of the ring shaped portion 72. The columnar protrusion 76 and the ring shaped portion 72 protrude from the end plate 70a in the same direction. A stepped hole 78 is formed at the center of the protrusion 76.

Figure 7:
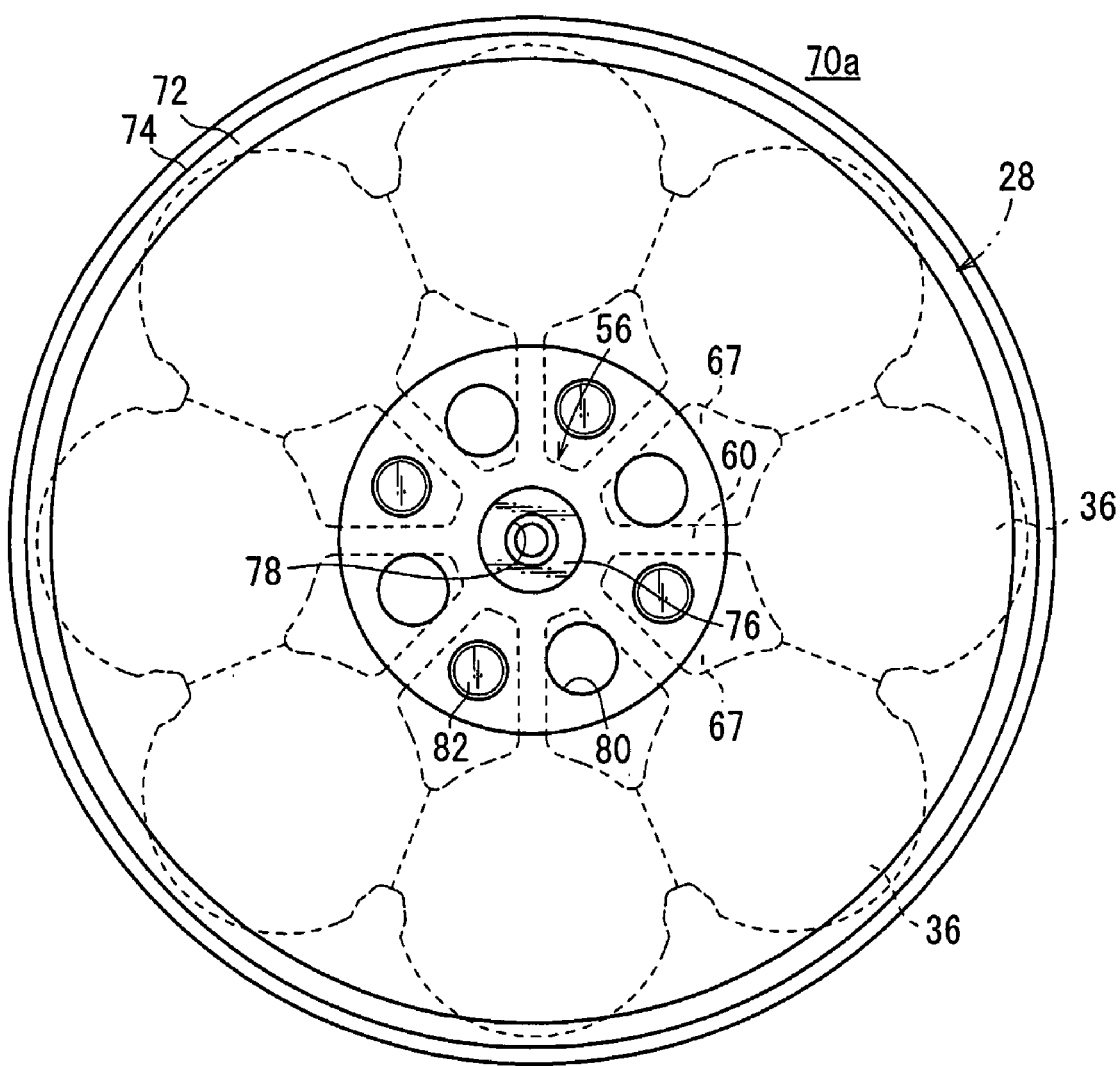
FIG. 7 is a front view showing an end plate of the fuel cell stack.

In the end plate 70a, holes 80 and screw holes 82 are formed alternately along a virtual circle around the protrusion 76. The holes 80 and the screw holes 82 are spaced from each other by predetermined intervals (angles). As shown in FIG. 7, the holes 80 and the screw holes 82 are provided at positions corresponding to respective spaces of the oxygen-containing gas supply unit 67 formed between the first and second bridges 34, 60. As shown in FIG. 1, the diameter of the end plate 70b is larger than the diameter of the end plate 70a. The end plate 70b is a thin electrically conductive plate.

The casing 18 includes a first case unit 86a containing the load applying mechanism 21 and a second case unit 86b containing the fuel cell stack 12. An insulating member is sandwiched between the first case unit 86a and the second case unit 86b. The insulating member is provided on the side of the second case unit 86b. The joint portion between the first case unit 86a and the second case unit 86b is tightened by screws 88 and nuts 90. The end plate 70b functions as a gas barrier for preventing entry of the hot exhaust gas or the hot air from the fluid unit 19 into the load applying mechanism 21.

An end of a ring shaped wall plate 92 is joined to the second case unit 86b, and a head plate 94 is fixed to the other end of the wall plate 92. The fluid unit 19 is provided symmetrically with respect to the central axis of the fuel cell stack 12. Specially, the substantially cylindrical reformer 16 is provided coaxially inside the substantially ring shaped heat exchanger 14.

A wall plate 96 is fixed to the groove 74 around the end plate 70a to form a flow passage member 98. The heat exchanger 14 and the reformer 16 are directly connected to the flow passage member 98. The air heated at the heat exchanger 14 is temporarily filled in a chamber 98a formed in the flow passage member 98. The holes 80 are formed as openings for supplying the air temporarily filled in the chamber 98a to the fuel cell stack 12.

A fuel gas supply pipe 100 and a reformed gas supply pipe (pipe member) 102 are connected to the reformer 16. The fuel gas supply pipe 100 extends to the outside from the head plate 94. The reformed gas supply pipe 102 is inserted into the stepped hole 78 of the end plate 70a, and connected to the fuel gas supply passage 30.

A gold gasket 103 is provided at a bottom 78a of the stepped hole 78 as a joint portion connecting the flow passage member 98 and the reformed gas supply pipe 102. The gold gasket 103 is made of pure gold (24K). As shown in FIGS. 1 and 2, the gold gasket 103 has a substantially ring shape, and, for example, the thickness of the gold gasket 103 is in the range of 0.1 mm to 2 mm.

An air supply pipe 104 and an exhaust gas pipe 106 are connected to the head plate 94. A channel 108 directly open to the flow passage member 98 from the air supply pipe 104 through the heat exchanger 14 and a channel 110 extending from the exhaust gas channel 68 of the fuel cell stack 12 to the exhaust gas pipe 106 through the heat exchanger 14 are provided in the casing 18.

The load applying mechanism 21 includes a first tightening unit 112a for applying a first tightening load T1 to a region around (near) the fuel gas supply passage 30 and a second tightening unit 112b for applying a second tightening load T2 to the electrolyte electrode assemblies 26. The second tightening load T2 is smaller than the first tightening load T1 (T1>T2).

As shown in FIGS. 1, 2, and 8, the first tightening unit 112a includes short first tightening bolts 114a screwed into the screw holes 82 provided along one diagonal line of the end plate 70a. The first tightening bolts 114a extend in the stacking direction of the fuel cells 11, and engage a first presser plate 116a. The first tightening bolts 114a are provided in the oxygen-containing gas supply unit 67 in the separators 28. The first presser plate 116a is a narrow plate, and engages the central position of the separator 28 to cover the fuel gas supply passage 30.

The second tightening unit 112b includes long second tightening bolts 114b screwed into the screw holes 82 provided along the other diagonal line of the end plate 70a. Ends of the second tightening bolts 114b extend through a second presser plate 116b having a curved outer section. Nuts 117 are fitted to the ends of the second tightening bolts 114b. The second tightening bolts 114b are provided in the oxygen-containing gas supply unit 67 in the separators 28. Springs 118 and spring seats 119 are provided in respective circular portions of the second presser plate 116b, at positions corresponding to the electrolyte electrode assemblies 26 on the circular disks 36 of the fuel cell 11. For example, the springs 118 are ceramic springs.

Operation of the fuel cell system 10 will be described below.

As shown in FIG. 3, in assembling the fuel cell system 10, firstly, the separator 28 is joined to the channel member 56 on its surface facing the cathode 22. Therefore, the fuel gas supply channel 66 connected to the fuel gas supply passage 30 is formed between the separator 28 and the channel member 56. The fuel gas supply channel 66 is connected to the fuel gas channel 46 through the fuel gas inlet 54 (see FIG. 6). The ring shaped insulating seal 69 is provided on each of the separators 28 around the fuel gas supply passage 30.

In this manner, the separator 28 is fabricated. Eight electrolyte electrode assemblies 26 are interposed between the separators 28 to form the fuel cell 11. As shown in FIGS. 3 and 4, the electrolyte electrode assemblies 26 are interposed between the surface 36a of one separator 28 and the surface 36b of the other separator 28. The fuel gas inlet 54 of the circular disk 36 is positioned at the center in each of the anodes 24.

A plurality of the fuel cells 11 are stacked in the direction indicated by the arrow A, and the end plates 70a, 70b are provided at opposite ends in the stacking direction. As shown in FIGS. 1, 2 and 8, the first presser plate 116a of the first tightening unit 112a is provided at the center of the fuel cell 11.

In this state, the short first tightening bolts 114a are inserted through the first presser plate 116a and the end plate 70b toward the end plate 70a. Tip ends of the first tightening bolts 114a are screwed into, and fitted to the screw holes 82 formed along one of the diagonal lines of the end plate 70a. The heads of the first tightening bolts 114a engage the first presser plate 116a. The first tightening bolts 114a are screwed into the screw holes 82 to adjust the surface pressure of the first presser plate 116a. In this manner, in the fuel cell stack 12, the first tightening load T1 is applied to the region near the fuel gas supply passage 30.

Then, the springs 118 and the spring seats 119 are aligned axially with the electrolyte electrode assemblies 26 at respective positions of the circular disks 36. The second presser plate 116b of the second tightening unit 112b engage the spring seats 119 provided at one end of the springs 118.

The long second tightening bolts 114b are inserted through the second presser plate 116b and the end plate 70b toward the end plate 70a. The tip end of the second tightening bolts 114b are screwed into, and fitted to the screw holes 82 formed along the other diagonal line of the end plate 70a. The nuts 117 are fitted to the heads of the second tightening bolts 114b. Therefore, by adjusting the state of the screw engagement between the nuts 117 and the second tightening bolts 114b, the second tightening load T2 is applied to the electrolyte electrode assemblies 26 by the elastic force of the respective springs 118.

The end plate 70b of the fuel cell stack 12 is sandwiched between the first case unit 86a and the second case unit 86b of the casing 18. The first case unit 86a and the second case unit 86b are fixed together by the screws 88 and the nuts 90. The fluid unit 19 is mounted in the second case unit 86b. The wall plate 96 of the fluid unit 19 is attached to the groove 74 around the end plate 70a. Thus, the flow passage member 98 is formed between the end plate 70a and the wall plate 96.

The fuel cell stack 12 and the reformer 16 are combined together in the following steps. Firstly, in the state where the gold gasket 103 is provided at the bottom 78a of the stepped hole 78 of the end plate 70a, the reformed gas supply pipe 102 is inserted into the stepped hole 78. Therefore, the end of the reformed gas supply pipe 102 is tightly attached to the gold gasket 103. The gold gasket 103 is deformed along the shape of the joint portion connecting the end plate 70a and the reformed gas supply pipe 102 by its malleability. Thus, the joint portion is sealed suitably.

Further, the joint portion is heated as necessary at the temperature around the melting point of gold, e.g., at about 1000° C. Thus, gold of the gold gasket 103 is partially melted, and the gold gasket 103 is welded to the joint portion to achieve further improvement in the sealing performance at the joint portion.

Next, in the fuel cell system 10, as shown in FIG. 1, a fuel (methane, ethane, propane, or the like) and, as necessary, water are supplied from the fuel gas supply pipe 100, and an oxygen-containing gas (hereinafter referred to as "air") is supplied from the air supply pipe 104.

The fuel is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 66 through the slit 62 in the separator 28 of each fuel cell 11 (see FIG. 6).

The fuel gas flows along the fuel gas supply channel 66 between the first and second bridges 34, 60, and flows into the fuel gas channel 46 from the fuel gas inlets 54 of the circular disks 36. The fuel gas inlets 54 are formed at positions corresponding to central regions of the anodes 24 of the electrolyte electrode assemblies 26. Thus, the fuel gas is supplied from the fuel gas inlets 54 to the substantially central positions of the anodes 24, and flows outwardly from the central regions of the anodes 24 along the fuel gas channel 46.

As shown in FIG. 1, air from the air supply pipe 104 flows through the channel 108 of the heat exchanger 14, and temporarily flows into the chamber 98a. The air flows through the holes 80 connected to the chamber 98a, and is supplied to the oxygen-containing gas supply unit 67 provided at substantially the center of the fuel cells 11. At this time, in the heat exchanger 14, as described later, since the exhaust gas discharged to the exhaust gas channel 68 flows through the channel 110, heat exchange between the air before supplied to the fuel cells 11 and the exhaust gas is performed. Therefore, the air is heated to a desired fuel cell operating temperature beforehand.

The oxygen-containing gas supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 6, in the oxygen-containing gas channel 50, the air flows from the inner circumferential edge (central region of the separator 28) to the outer circumferential edge (outer region of the separator 28) of, i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the air flows in one direction indicted by the arrow B on the electrode surface of the cathode 22. At this time, oxygen ions flow through the electrolyte 20 toward the anode 24 for generating electricity by electrochemical reactions.

The exhaust gas discharged to the outside of the respective electrolyte electrode assemblies 26 flows through the exhaust gas channel 68 in the stacking direction. When the exhaust gas flows through the channel 110 of the heat exchanger 14, heat exchange between the exhaust gas and the air is carried out. Then, the exhaust gas is discharged into the exhaust gas pipe 106.

In the structure, the hot air heated at the heat exchanger 14 to the high temperature of about 700° C. is temporarily filled in the chamber 98a of the flow passage member 98, and the hot fuel gas at the temperature of about 700° C. flows through the reformed gas supply pipe 102. Therefore, the area near the joint portion between the flow passage member 98 and the reformed gas supply pipe 102 is exposed to the oxidizing atmosphere and the reducing atmosphere at high temperature.

Thus, in the first embodiment, as shown in FIG. 1, the gold gasket 103 as a gasket member is provided at the joint portion, i.e., at the bottom 78a of the stepped hole 78. Therefore, even in the presence of the high temperature environment, or the oxidizing atmosphere and the reducing atmosphere, it is possible to achieve the stable sealing performance and durability.

Further, the gold gasket 103 has malleability. The gold gasket 103 has a thin plate shape having the thickness of, e.g., 0.1 mm, and tightly contacts the joint portion. Thus, even if heat expansion or heat compression occurs repeatedly near the joint portion, the gold gasket 103 can be shaped to adjust to the environment easily. That is, for example, unlike the glass seal material, the gold gasket 103 is not shattered. It is possible to prevent degradation of the fuel cell stack 12. Thus, the gold gasket 103 tightly contacts the joint portion desirably, and improvement in the sealing performance and reliability is achieved. The gold gasket 103 can be used in any position, and is suitable for general use.

Further, even if another member, e.g., the electrolyte electrode assembly 26 is degraded to increase the amount of unreacted fuel gas, the gold gasket 103 keeps its solid state in the operating ambient temperature (600° C. to 800° C.), and utilizes its malleability to firmly, and tightly contact the joint portion. Thus, for example, combustion in the separator 28 due to leakage of the fuel gas before reaction does not occur, and the uniform operating temperature in the fuel cell 11 is achieved. Further, it is possible to prevent damage or the like of the electrolyte electrode assembly 26.

Further, since the reformed gas supply pipe 102 is provided at the center of the fuel cell 11, the temperature of the fuel gas flowing through the reformed gas supply pipe 102 is maintained suitably, and improvement in the thermal efficiency of the fuel cell 11 is achieved.

Further, as the material of the gasket member, the use of copper (Cu), silver (Ag), nickel (Ni), lead (Pd), or platinum (Pt) may be considered instead of gold (Au). However, these materials cannot be used suitably due to the problems of, e.g., low melting point (Ag), high electrical resistance (Ni, Pd, and Pt), low malleability (Ni), and low oxidation resistance (Cu, Ag, and Pd).

Figure 9:
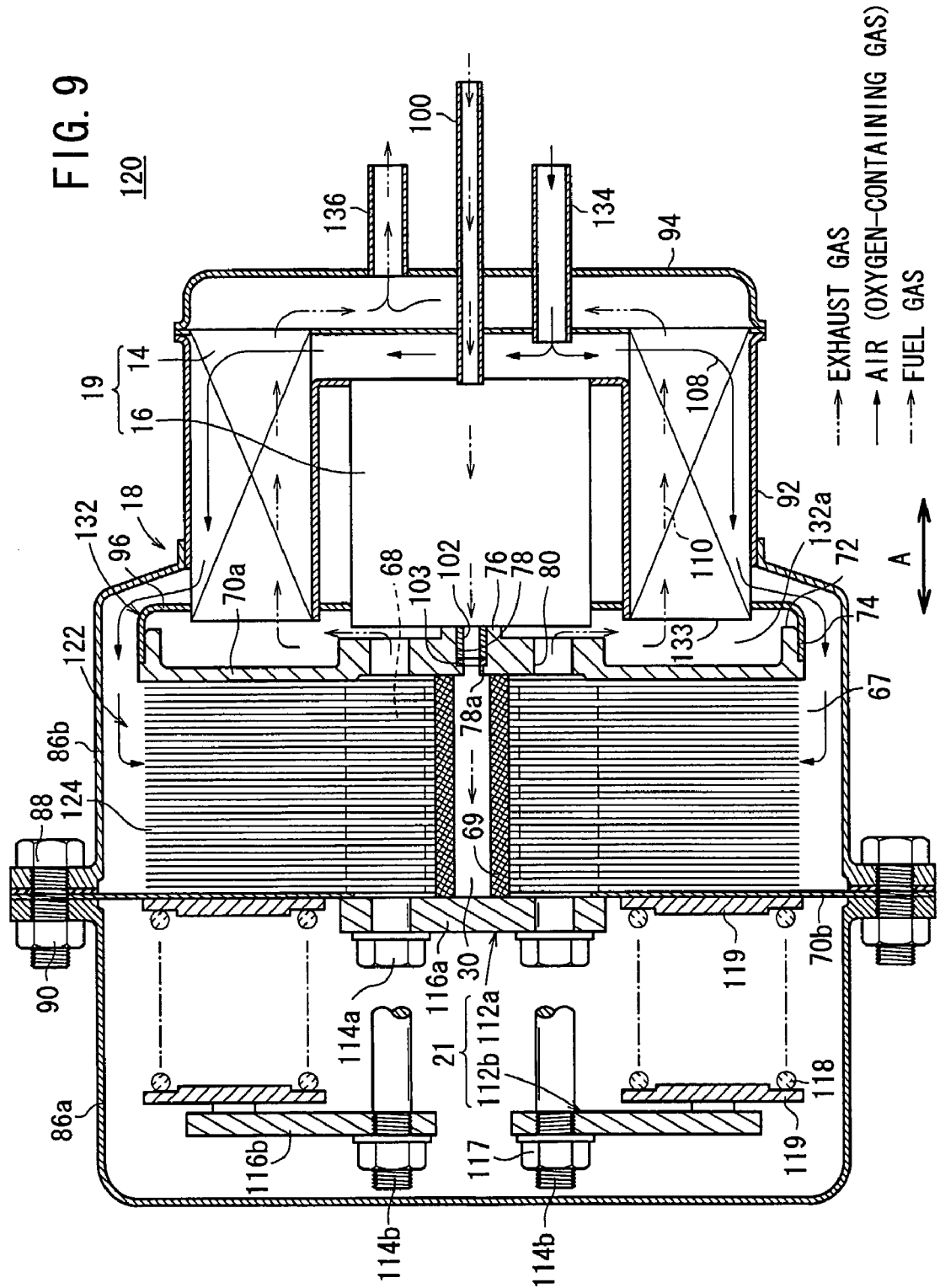
FIG. 9 is a partial cross sectional view showing a fuel cell system according to a second embodiment of the present invention.

FIG. 9 is a partial cross sectional view showing a fuel cell system 120 according to a second embodiment of the present invention. The constituent elements that are identical to those of the fuel cell system 10 according to the first embodiment are labeled with the same reference numeral, and detailed description thereof will be omitted.

The fuel cell system 120 includes a fuel cell stack 122 provided in a casing 18. The fuel cell stack 122 is formed by stacking a plurality of fuel cells 124 in a direction indicated by an arrow A. The fuel cell 124 is sandwiched between end plates 70a, 70b.

Figure 10:
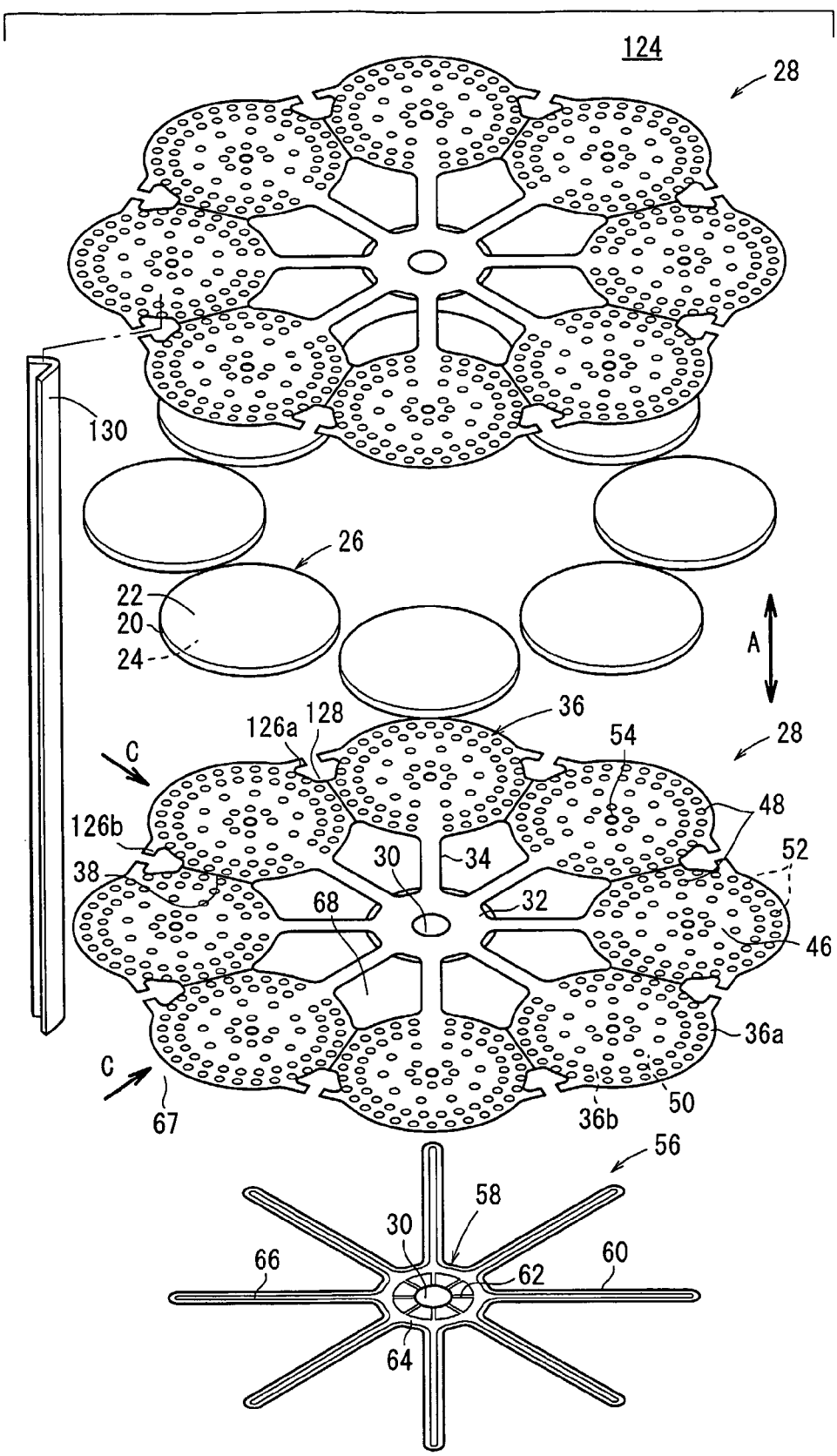
FIG. 10 is an exploded perspective view showing a fuel cell of the fuel cell system.

As shown in FIGS. 10 and 11, in the fuel cell 124, the oxygen-containing gas flows along the cathode 22 of the electrolyte electrode assembly 26 in the direction indicated by an arrow C from the outer circumferential edge to the inner circumferential edge of the cathode 22, i.e., in the direction opposite to the flow direction in the first embodiment.

An oxygen-containing gas supply unit 67 is provided outside the circular disks 36. An exhaust gas channel 68 is formed by spaces between the first bridges 34 inside the circular disks 36. The exhaust gas channel 68 extends in the stacking direction. Each of the circular disks 36 includes extensions 126a, 126b protruding toward the adjacent circular disks 36 on both sides, respectively. Spaces 128 are formed between the adjacent extensions 126a, 126b. Baffle plates 130 are provided in the respective spaces 128. The baffle plates 130 extend along the spaces 128 in the stacking direction.

As show in FIG. 12, the oxygen-containing gas channel 50 is connected to the oxygen-containing gas supply unit 67 for supplying the oxygen-containing gas from the spaces between the outer regions of the circular disks 36 and the outer regions of the electrolyte electrode assemblies 26 in the direction indicated by the arrow C. The oxygen-containing gas supply unit 67 is formed around the separators 28 including area outside the extensions 126a, 126b of the circular disks 36.

As shown in FIG. 9, a flow passage member 132 having a chamber 132a connected to the exhaust gas channel 68 through the holes 80 is formed at the end plate 70a. The exhaust gas discharged from the fuel cells 124 is temporarily filled in the chamber 132a. The exhaust gas flows through the channel 110 in the heat exchanger 14 through an opening 133 opened directly to the chamber 132a.

An air supply pipe 134 and an exhaust gas pipe 136 are connected to the head plate 94. The air supply pipe 134 extends up to a position near the reformer 16. An end of the exhaust gas pipe 136 is connected to the head plate 94.

In the second embodiment, the fuel gas flows from the fuel gas supply pipe 100 to the fuel gas supply passage 30 through the reformer 16. The air as the oxygen-containing gas flows from the air supply pipe 134 into the channel 108 in the heat exchanger 14, and is supplied to the oxygen-containing gas supply unit 67 outside the fuel cells 124. As shown in FIG. 12, the air flows from the spaces between the outer regions of the electrolyte electrode assemblies 26 and the outer regions of the circular disks 36 in the direction indicated by the arrow C, and is supplied to the oxygen-containing gas channel 50 in each of the electrolyte electrode assemblies 26.

Thus, power generation is performed in the electrolyte electrode assemblies 26. The exhaust gas as the mixture of the fuel gas and the air after consumption in the reactions of the power generation flows in the stacking direction through the exhaust gas channel 68 in the separators 28. The exhaust gas flows through the holes 80, and is temporarily filled in the chamber 132a of the flow passage member 132 formed at the end plate 70a. Further, when the exhaust gas flows through the channel 110 into the heat exchanger 14, heat exchange is performed between the exhaust gas and the air. Then, the exhaust gas is discharged into the exhaust gas pipe 136.

As described above, since the exhaust gas is filled in the chamber 132a, the area near the joint portion between the flow passage member 132 and the reformed gas supply pipe 102 has a significantly high temperature. Further, the joint portion is exposed to the reducing atmosphere due to the flow of the fuel gas.

In the second embodiment, the gold gasket 103 is provided at the joint portion. Even in the presence of the reducing atmosphere at high temperature, the gold gasket 103 is capable of achieving the stable sealing performance and durability. Thus, the same advantages as in the case of the first embodiment can be obtained. For example, with the simple structure, the desired sealing performance is achieved, degradation is prevented, and the gold gasket 103 can be used suitably for a long period of time.

INDUSTRIAL APPLICABILITY

In the present invention, the gasket member provided at the joint portion between the flow passage member and the tube member is made of gold. Therefore, the gasket member (gold gasket) achieves stable sealing performance and durability even in the presence of the high temperature environment or the oxidizing atmosphere and the reducing atmosphere.

Further, it is possible to utilize malleability of gold for sealing. Therefore, the gasket member tightly contacts the seal portion. Reliability of the sealing performance is improved. The gasket member can be used in any position, and the gasket member is suitable for general use.

Further, even if another member such as the electrolyte electrode assembly is degraded resulting in an increase in the amount of unburned fuel gas, the gasket member is not degraded, and the desired sealing performance can be achieved reliably. Thus, the fuel gas before reaction is not combusted in the separator. The uniform operating temperature in the fuel cell is achieved. Further, it is possible to prevent damage or the like of the electrolyte electrode assembly.

The invention claimed is:

1. A fuel cell system comprising:
    a fuel cell including an electrolyte electrode assembly and separators sandwiching said electrolyte electrode assembly, said electrolyte electrode assembly including an anode, a cathode, and an electrolyte interposed between said anode and said cathode;
    a flow passage member provided at one end of said fuel cell, an oxygen-containing gas to be supplied to said cathode flowing through said flow passage member;

a pipe member connected to said flow passage member for supplying a fuel gas to said anode; and a gold gasket provided at a joint portion between said flow passage member and said pipe member, wherein the gold gasket is provided at a terminal end and around a circumference of the pipe member.

2. A fuel cell system according to claim 1, further comprising:

a reformer provided adjacent to said flow passage member to reform a fuel for producing the fuel gas, said pipe member being connected to said reformer and a heat exchanger provided around said reformer for heating the oxygen-containing gas to be supplied to said fuel cell, wherein said reformer and said heat exchanger are provided coaxially with the central axis of said fuel cell.

3. A fuel cell system according to claim 1, wherein said pipe member is connected to a central portion of said fuel cell.

4. A fuel cell system according to claim 2, wherein said heat exchanger exchanges heat between the oxygen-containing gas to be supplied to said cathode and an exhaust gas.

5. A fuel cell system according to claim 2, wherein said flow passage member comprises:

an end plate as part of said fuel cell; and a wall plate connected to said reformer and said heat exchanger, and fixed to said end plate.

6. A fuel cell system comprising:

a fuel cell including an electrolyte electrode assembly and separators sandwiching said electrolyte electrode assembly, said electrolyte electrode assembly including an anode, a cathode, and an electrolyte interposed between said anode and said cathode;

a flow passage member provided at one end of said fuel cell, an exhaust gas discharged from said fuel cell flowing through said flow passage member;

a pipe member connected to said flow passage member for supplying a fuel gas to said anode; and a gold gasket provided at a joint portion between said flow passage member and said pipe member, wherein the gold gasket is provided at a terminal end and around a circumference of the pipe member.

7. A fuel cell system according to claim 6, further comprising:

a reformer provided adjacent to said flow passage member to reform a fuel for producing the fuel gas, said pipe member being connected to said reformer; and a heat exchanger provided around said reformer for heating an oxygen-containing gas to be supplied to said fuel cell, wherein said reformer and said heat exchanger are provided coaxially with the central axis of said fuel cell.

8. A fuel cell system according to claim 6, wherein said pipe member is connected to a central portion of said fuel cell.

9. A fuel cell system according to claim 7, wherein said heat exchanger exchanges heat between the oxygen-containing gas to be supplied to said cathode and the exhaust gas.

10. A fuel cell system according to claim 7, wherein said flow passage member comprises:

an end plate as part of said fuel cell; and a wall plate connected to said reformer and said heat exchanger, and fixed to said end plate.

* * * * *

UNITED STATES PATENT AND TRADEMARK OFFICE
CERTIFICATE OF CORRECTION

PATENT NO. : 7,727,661 B2 Page 1 of 1
APPLICATION NO. : 11/795112
DATED : June 1, 2010
INVENTOR(S) : Tetsuya Ogawa It is certified that error appears in the above-identified patent and that said Letters Patent is hereby corrected as shown below:

Title Page in field (86) PCT No.,

"PCT/JP2006/000782" should be replaced with -- PCT/JP2006/300782 --

Signed and Sealed this

Twenty-fourth Day of August, 2010

David J. Kappos
*Director of the United States Patent and Trademark Office*